(12) United States Patent
Yoneda et al.

(10) Patent No.: US 10,051,157 B2
(45) Date of Patent: Aug. 14, 2018

(54) IMAGE PROCESSING APPARATUS AND IMAGE PROCESSING METHOD GENERATING SOFT PROOF IMAGE DISPLAY WITH COLOR ADJUSTMENT FOR PRINTING APPARATUS

(71) Applicant: CANON KABUSHIKI KAISHA, Tokyo (JP)

(72) Inventors: Naoto Yoneda, Tokyo (JP); Tomoaki Kikuchi, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/158,876

(22) Filed: May 19, 2016

(65) Prior Publication Data

US 2016/0352973 A1    Dec. 1, 2016

(30) Foreign Application Priority Data

May 26, 2015 (JP) ................................ 2015-106459
Apr. 26, 2016 (JP) ................................ 2016-088140

(51) Int. Cl.
   *H04N 1/60*       (2006.01)
   *G06K 15/02*      (2006.01)

(52) U.S. Cl.
   CPC ......... *H04N 1/6011* (2013.01); *G06K 15/025* (2013.01); *H04N 1/6052* (2013.01)

(58) Field of Classification Search
   CPC ... H04N 1/6011; H04N 1/6052; G06K 15/025
   See application file for complete search history.

(56) References Cited

U.S. PATENT DOCUMENTS

2004/0001072 A1* 1/2004 Newman ............... H04N 1/6011
                                                   345/593
2008/0024804 A1* 1/2008 Yamanaka ........... H04N 1/6011
                                                   358/1.9

FOREIGN PATENT DOCUMENTS

JP    2008-171268 A    7/2008

* cited by examiner

*Primary Examiner* — Christopher D Wait
(74) *Attorney, Agent, or Firm* — Cowan, Liebowitz & Latman, P.C.

(57) ABSTRACT

An image processing apparatus is caused to execute adjustment processing for an image; generate a soft proof image based on the image, a parameter adjusted in the adjustment processing, and characteristic information on a printing apparatus; display the soft proof image on a screen; and store the parameter of the adjusted image for which the adjustment processing is performed while the soft proof image is being displayed on the screen, and information relating to the printing apparatus, in association with the image.

6 Claims, 9 Drawing Sheets

IMAGE PROCESSING APPARATUS AND IMAGE PROCESSING METHOD GENERATING SOFT PROOF IMAGE DISPLAY WITH COLOR ADJUSTMENT FOR PRINTING APPARATUS

BACKGROUND OF THE INVENTION

Field of the Invention

The present disclosure relates to an image processing apparatus and an image processing method.

Description of the Related Art

There is a technology for simulating an appearance of a printed matter to be actually printed on a personal computer or the like and previewing an image obtained by such a simulation on a display screen. The image obtained in this manner is referred to as "soft proof image".

A user conducts image processing, e.g., a color adjustment with a soft proof image being displayed on the display screen, thereby being capable of smoothly obtaining a printed matter having an intended appearance.

Incidentally, there is proposed a technology for notifying a user how much of a color difference there is between a color included in print data and a color expressed by an image forming apparatus before printing, and for conducting printing through use of a printing apparatus with a small color difference among a plurality of printing apparatus (Japanese Patent Application Laid-Open No. 2008-171268).

However, in a related-art image forming system, there is sometimes a case where a printed matter having an appearance equivalent to that of a soft proof image displayed on a display screen of a display unit cannot be obtained.

SUMMARY OF THE INVENTION

According to an aspect of an embodiment, there is provided an image processing apparatus including a processor; and a memory storing a program which, when executed by the processor, causes the image processing apparatus to: execute adjustment processing for an image; generate a soft proof image based on the image, a parameter adjusted in the adjustment processing, and characteristic information on a printing apparatus; display the soft proof image on a screen; and store the parameter of the adjusted image for which the adjustment processing is performed while the soft proof image is being displayed on the screen, and information relating to the printing apparatus, in association with the image.

According to another aspect of an embodiment, there is provided an image processing apparatus including a processor; and a memory storing a program which, when executed by the processor, causes the image processing apparatus to: acquire first characteristic information relating to a printing apparatus to be used for printing of an image from the printing apparatus; determine whether or not the first characteristic information and second characteristic information on a printing apparatus used to generate a soft proof image match each other when the second characteristic information and a first parameter adjusted while the soft proof image is being displayed on a screen are stored in association with the image; and generate print data by applying the first parameter to the image when the first characteristic information and the second characteristic information match each other.

According to further another aspect of an embodiment, there is provide an image processing method including executing adjustment processing for an image; generating a soft proof image based on the image, a parameter adjusted in the adjustment processing, and characteristic information on a printing apparatus; displaying the soft proof image on a screen; and storing the parameter of the adjusted image for which the adjustment processing is performed while the soft proof image is being displayed on the screen, and information relating to the printing apparatus, in association with the image.

According to further another aspect of an embodiment, there is an image processing method including acquiring first characteristic information relating to a printing apparatus to be used for printing of an image from the printing apparatus; determining whether or not the first characteristic information and second characteristic information on a printing apparatus used to generate a soft proof image match each other when the second characteristic information and a first parameter adjusted while the soft proof image is being displayed on a screen are stored in association with the image; and generating print data by applying the first parameter to the image when the first characteristic information and the second characteristic information match each other.

Further features of the present invention will become apparent from the following description of exemplary embodiments with reference to the attached drawings.

DESCRIPTION OF THE EMBODIMENTS

Even after a color adjustment or the like is conducted through use of soft proofing, when printing is conducted through use of a printing apparatus (printer) different from a printing apparatus having the characteristic taken into consideration in the soft proofing, a printed matter is formed to have an appearance that is not intended by a user.

There is also a case where a printed matter having an appearance different from a soft proof image is generated when, for example, a greatly enlarged image is printed.

The inventor of the present invention has reached the following invention as a result of intensive investigation.

Embodiments of the present invention are described below in detail with reference to the drawings. However, the present invention is not limited to the following embodiments. The following embodiments are not to limit the invention laid down in the scope of patent claims, and not all of combinations of features described in the following embodiments are indispensable to the solving means of the present invention.

First Embodiment

An image processing apparatus, an image processing method, a printing apparatus, a printing method, and a computer program according to a first embodiment of the present invention are described with reference to FIGS. 1 to 5.

An image processing apparatus 100 according to this embodiment forms an image forming system according to this embodiment in cooperation with a printing apparatus 200 according to this embodiment described later. The number of printing apparatus 200 that form the image forming system according to this embodiment is not limited to one. The image forming system according to this embodiment can include a plurality of the printing apparatus 200. A plurality of the printing apparatus 200 having the same printing characteristic may be included in the image forming system according to this embodiment, or a plurality of the printing apparatus 200 having different printing characteristics may be included in the image forming system according to this embodiment. There may also be a case where the printing apparatus 200 included in the image forming system according to this embodiment is removed and another printing apparatus 200 is newly included in the image forming system. Such another printing apparatus 200 may have the same printing characteristic as that of the removed printing apparatus 200, or may have a printing characteristic different from that of the removed printing apparatus 200.

Figure 1:
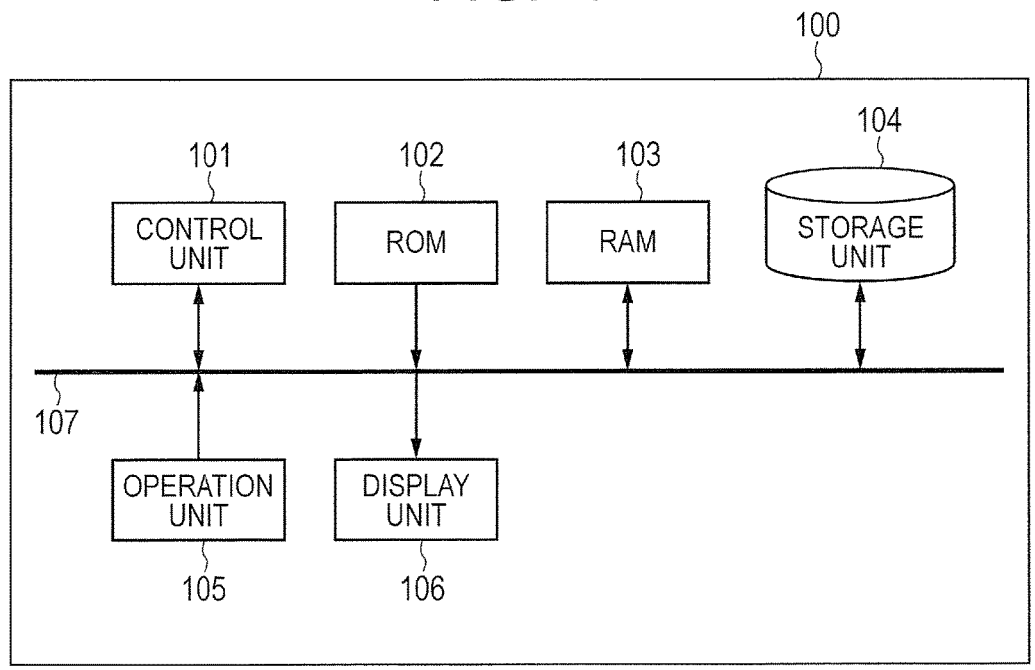
FIG. 1 is a block diagram for illustrating a configuration of an image processing apparatus according to a first embodiment.

First, the image processing apparatus 100 according to this embodiment is described with reference to FIG. 1. FIG. 1 is a block diagram for illustrating a configuration of the image processing apparatus according to this embodiment.

The image processing apparatus 100 according to this embodiment is formed of, for example, a personal computer having installed thereon a computer program or the like for executing the image processing method according to this embodiment. The description is made below by taking an exemplary case where the image processing apparatus 100 is formed of a personal computer, but the image processing apparatus 100 is not limited to the personal computer. For example, the image processing apparatus 100 may be an apparatus serving also as an image pickup apparatus that is, for example, a digital camera.

As illustrated in FIG. 1, the image processing apparatus 100 according to this embodiment includes, for example, a control unit 101, a read only memory (ROM) 102, a random access memory (RAM) 103, a storage unit 104, an operation unit 105, a display unit 106, and a system bus 107.

The control unit 101 is configured to administer control of the entire image processing apparatus 100 according to this embodiment, and to execute various kinds of processing such as image processing. As the control unit 101, for example, a central processing unit (CPU) is used.

The ROM 102 is configured to store an application program, parameters, and the like that require no changes. Examples of such an application program include an application program for executing the image processing method according to this embodiment. The application program for executing the image processing method according to this embodiment may be stored in the storage unit 104.

The RAM 103 is configured to temporarily store an application program, data, and the like.

The storage unit 104 is configured to store an operating system (OS), an application program, various kinds of data (files) such as image data and a profile, and the like. The storage unit 104 may be built into the image processing apparatus 100, or may be able to be inserted into or removed from the image processing apparatus 100. Examples of the storage unit 104 built in the image processing apparatus 100 include a hard disk drive and a flash memory. Examples of the storage unit 104 that can be inserted into or removed from the image processing apparatus 100 include a floppy (trademark) disk (FD), an optical disc, e.g., a compact disc (CD), a magnetic card, an optical card, an IC card, a memory card, and a USB memory. The image data stored in the storage unit 104 is acquired by, for example, photographing using a digital camera or scanning using a film scanner. The operating system and the like may be stored in the ROM 102.

The control unit 101 expands the operating system, the application program, and the like, which are stored in the ROM 102, the storage unit 104, and the like, into the RAM 103, and executes the application program and the like expanded in the RAM 103. The application program and the like are stored in the ROM 102, the storage unit 104, and the like as, for example, program codes that can be read by the control unit 101, and the control unit 101 executes the program codes stored in the ROM 102, the storage unit 104, and the like. The application program enables the control unit 101 to function as various units described as follows.

The control unit 101 functions as a unit configured to read an image file from the storage unit 104 or the like, and to acquire image data from the read image file.

Further, the control unit 101 functions as an image processing unit configured to execute various kinds of image processing for the image data. More specifically, for example, the control unit 101 functions as a color adjustment unit (color editing unit) configured to conduct a color adjustment (color editing) for the image data. The control unit 101 also functions as a unit configured to recognize the printing apparatus 200 illustrated in FIG. 2 connected to the image processing apparatus 100, namely, the currently-connected printing apparatus 200. The currently-connected printing apparatus 200 is, for example, the printing apparatus 200 that is about to be used for printing. The control unit 101 also functions as a unit configured to receive characteristic information relating to the printing apparatus 200 from the currently-connected printing apparatus 200 as printing apparatus characteristic information (printer characteristic information). Examples of the printing apparatus characteristic information include a model (model name) of the printing apparatus 200 and profile data indicating a printing characteristic and a color characteristic of the printing apparatus 200.

The control unit 101 also functions as a unit configured to identify a profile corresponding to the currently-connected printing apparatus 200 based on the printing apparatus characteristic information acquired from the currently-connected printing apparatus 200. The profile is stored in, for example, the storage unit 104 or the like. The control unit 101 identifies the profile corresponding to the currently-connected printing apparatus 200 from among a plurality of profiles stored in the storage unit 104 or the like based on the printing apparatus characteristic information acquired from the currently-connected printing apparatus 200.

The control unit 101 also functions as a unit configured to display an image on the display unit 106 by expanding the image data or the like read from the storage unit 104 or the like into a memory for display (not shown).

The control unit 101 also functions as a soft proof image generation unit (generation unit) configured to generate a soft proof image taking the characteristic of the printing apparatus 200 or the like into consideration.

The control unit 101 also functions as a recording unit configured to record a color adjustment parameter set by the user when a color adjustment was conducted and the printing apparatus characteristic information indicating the characteristic of the printing apparatus 200 having the characteristic taken into consideration when the color adjustment was conducted, into the image file in association with each other. In this case, the color adjustment parameter recorded in association with the printing apparatus characteristic information is the color adjustment parameter set by the user when the color adjustment was conducted with the soft proof image being displayed on a display screen of the display unit 106. The printing apparatus characteristic information recorded in the image file in association with such a color adjustment parameter (color editing parameter) is the printing apparatus characteristic information on the printing apparatus 200 having the characteristic taken into consideration during a color adjustment operation. Such a color adjustment parameter may be referred to also as "color adjustment parameter for a specific printing apparatus" because the printing characteristic of the specific printing apparatus 200 has been taken into consideration.

In a case where each color adjustment has been conducted with a soft proof image being displayed on the display screen of the display unit 106 by taking the characteristic of each of the plurality of printing apparatus 200 into consideration, the control unit 101 conducts the following processing. That is, in this case, the control unit 101 records each color adjustment parameter set during each color adjustment and each piece of printing apparatus characteristic information on each of the printing apparatus 200 having the characteristic taken into consideration during each color adjustment, into the image file in association with each other.

The operation unit 105 is configured to receive the user's operation conducted on the image processing apparatus 100. Examples of the operation unit 105 include a keyboard and a mouse. The operation unit 105 receives, for example, an adjustment operation (editing operation) that is, for example, a color adjustment operation conducted by the user. The operation unit 105 also receives, for example, the user's operation as to whether or not to apply the soft proofing.

The display unit 106 is configured to display data held on the image processing apparatus 100, data being subjected to the image processing, data supplied from the outside of the image processing apparatus 100, and the like. Examples of the display unit 106 include a liquid crystal display and a CRT display.

The respective components (units) 101 to 106 that form the image processing apparatus 100 according to this embodiment are enabled to communicate to/from one another through the system bus 107.

Figure 2:
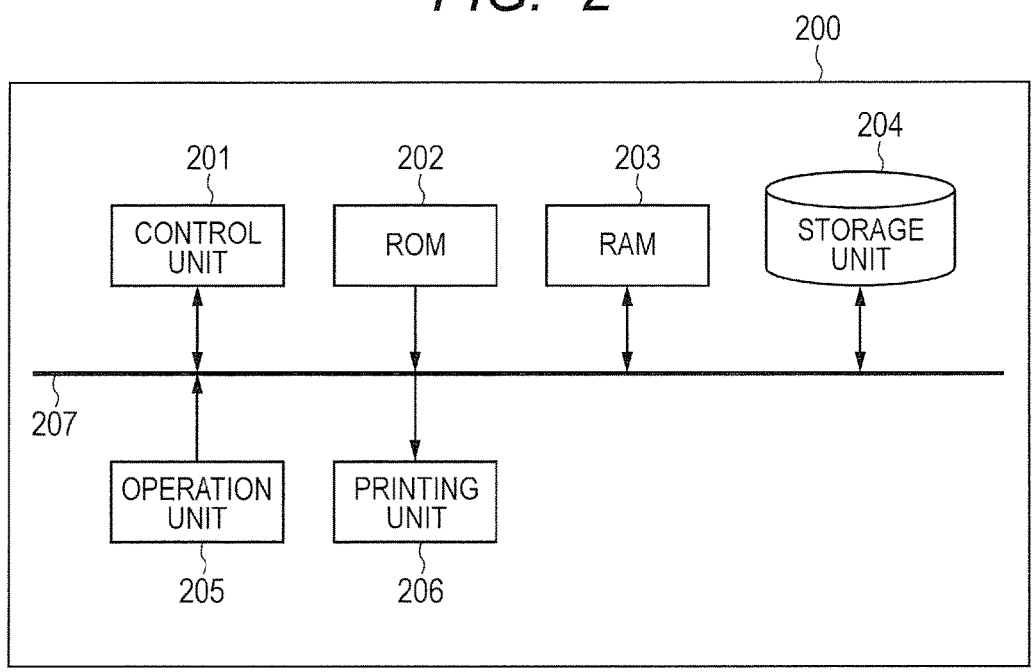
FIG. 2 is a block diagram for illustrating a configuration of a printing apparatus according to the first embodiment.

Next, the printing apparatus 200 according to this embodiment is described with reference to FIG. 2. FIG. 2 is a block diagram for illustrating a configuration of the printing apparatus to be connected to the image processing apparatus according to this embodiment.

As illustrated in FIG. 2, the printing apparatus 200 according to this embodiment includes a control unit 201, a ROM 202, a RAM 203, a storage unit 204, an operation unit 205, a printing unit 206, and a system bus 207.

The control unit 201 is configured to administer control of the entire printing apparatus 200, and to execute various kinds of processing such as printing processing. As the control unit 201, for example, a CPU is used.

The ROM 202 is configured to store an application program, parameters, and the like that require no changes. Examples of such an application program include an application program for executing various kinds of processing, e.g., the printing method according to this embodiment. The application program for executing the printing method according to this embodiment may be stored in the storage unit 204.

The RAM 203 is configured to temporarily store an application program, data, and the like.

The storage unit 204 is configured to store an operating system, an application program, various kinds of data, and the like. The storage unit 204 may be built into the printing apparatus 200, or may be able to be inserted into or removed from the printing apparatus 200. Examples of the storage unit 204 built in the printing apparatus 200 include a hard disk drive and a flash memory. Examples of the storage unit 204 that can be inserted into or removed from the printing apparatus 200 include a floppy (trademark) disk (FD), an optical disc, e.g., a CD, a magnetic card, an optical card, an IC card, a memory card, and a USB memory. The operating system and the like may be stored in the ROM 202.

The operation unit 205 is configured to receive the user's operation conducted on the printing apparatus 200. Examples of the operation unit 205 include an operation button, a touch panel, a keyboard, and a mouse.

The printing unit 206 is configured to print data supplied from the image processing apparatus 100, data held on the printing apparatus 200, and other such data.

The respective components (units) 201 to 206 that form the printing apparatus 200 according to this embodiment are enabled to communicate to/from one another through the system bus 207.

The control unit 201 expands the operating system, the application program, and the like, which are stored in the ROM 202, the storage unit 204, and the like, into the RAM 203, and executes the application program and the like expanded in the RAM 203.

The application program and the like are stored in the ROM 202, the storage unit 204, and the like as, for example, program codes that can be read by the control unit 201, and the control unit 201 executes the program codes stored in the ROM 202, the storage unit 204, and the like. The application program enables the control unit 201 to function as various units described as follows.

The control unit 201 can function as a unit configured to read an image file stored in the storage unit 204 or the like. The image file is subjected to image processing, e.g., a color adjustment operation by the image processing apparatus 100 according to this embodiment or the like. The control unit 201 also functions as a unit configured to acquire image data, a color adjustment parameter, printing apparatus characteristic information, and the like from the read image file.

The control unit 201 also functions as a determination unit configured to conduct the following processing in a case where the color adjustment parameter and the printing apparatus characteristic information are recorded in the image file in association with each other. That is, the control unit 201 functions as a determination unit configured to determine, in the above-mentioned case, whether or not the color adjustment parameter is the color adjustment parameter taking the characteristic of the printing apparatus 200 that is about to be used for the printing into consideration based on the printing apparatus characteristic information.

The control unit 201 also functions as an application unit configured to apply such a color adjustment parameter as described below when an image is to be printed in a case where the color adjustment parameter taking the characteristic of the printing apparatus 200 that is about to be used for the printing into consideration is included in the image file. That is, the control unit 201 functions as an application unit configured to apply, in the above-mentioned case, when an image is to be printed, the color adjustment parameter taking the characteristic of the printing apparatus 200 that is about to be used for the printing into consideration. The control unit 201 also functions as a unit configured to cause the printing unit 206 to print the image.

It suffices that the image processing apparatus 100 according to this embodiment and the printing apparatus 200 are connected logically to each other, and no limitation is imposed on the connection method. For example, the image processing apparatus 100 and the printing apparatus 200 may be connected directly to each other, or the image processing apparatus 100 and the printing apparatus 200 may be connected to each other through a local area network. Further, the image processing apparatus 100 and the printing apparatus 200 may be connected to each other through a cable, or may be connected to each other in a wireless manner.

Figure 3:
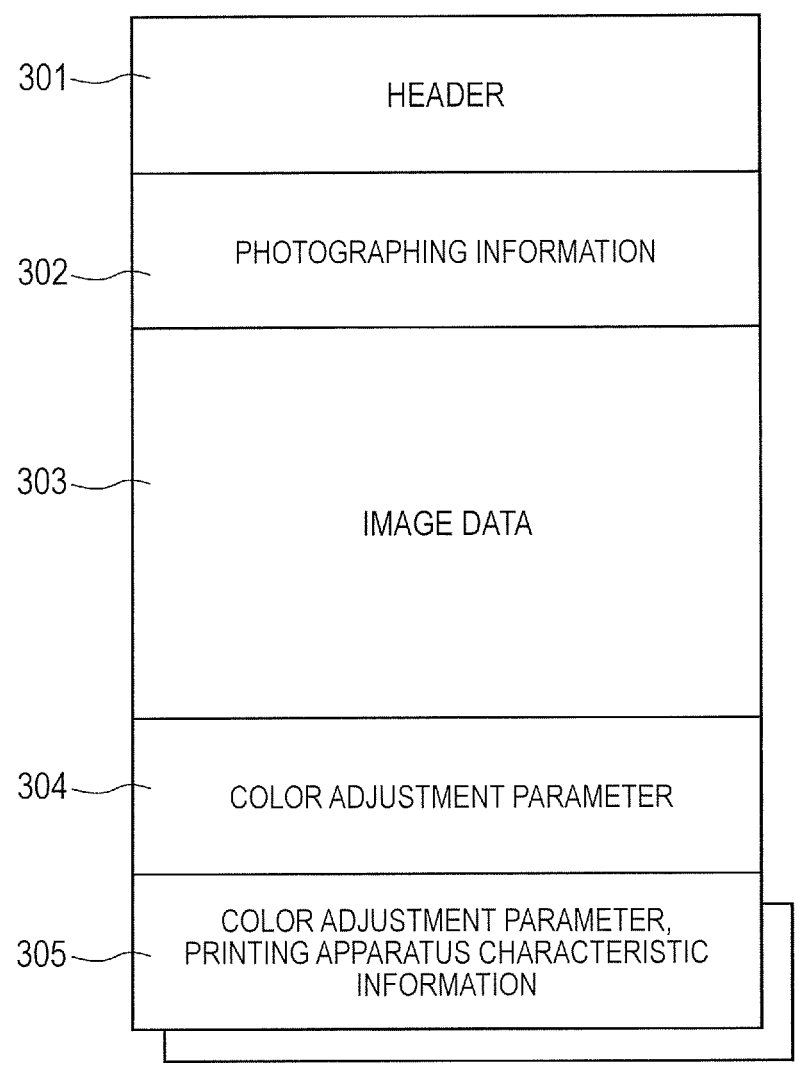
FIG. 3 is a diagram for illustrating a structure of an image file according to the first embodiment.

FIG. 3 is a diagram for illustrating a structure of an image file generated by the image processing apparatus 100 according to this embodiment.

As illustrated in FIG. 3, the image file generated by the image processing apparatus 100 according to this embodiment is roughly classified into five sections 301 to 305.

The section 301 is a header section for recording a basic structure of the image file.

The section 302 is a section for recording, for example, photographing information of a digital camera or the like when the image file has been obtained through photographing using the digital camera or the like. In the section 302, basic information such as a size of the image data and a color bit depth is also recorded.

The section 303 is a section for recording the image data indicating pixel values of respective pixels. The section 304 is a section for recording the color adjustment parameter set when the color adjustment was conducted without the soft proof image being displayed. The color adjustment was conducted without the soft proof image being displayed, and hence the color adjustment parameter can be said to be a color adjustment parameter that does not depend on the printing characteristic of the specific printing apparatus 200. Otherwise, when the color adjustment has not been conducted, the color adjustment parameter having a default value is recorded in the section 304. Further, when the color adjustment has not been particularly conducted without the soft proof image being displayed, the color adjustment parameter having a default value is recorded in the section 304.

The section 305 is a section for recording the color adjustment parameter set when the color adjustment of an image was conducted while the soft proof image taking the characteristic of the printing apparatus 200 into consideration was being displayed on the display screen of the display unit 106. The color adjustment parameter set when the color adjustment was conducted with the soft proof image being displayed on the display screen of the display unit 106 and the printing apparatus characteristic information on the printing apparatus 200 having the characteristic taken into consideration during the color adjustment are recorded in the section 305 in association with each other. In the case where each color adjustment has been conducted with the soft proof image being displayed on the display screen of the display unit 106 by taking the characteristic of each of the plurality of printing apparatus 200 into consideration, the color adjustment parameter and the printing apparatus characteristic information are recorded into the section 305 as follows. That is, in this case, each color adjustment parameter set during each color adjustment and each piece of printing apparatus characteristic information on each of the printing apparatus 200 having the characteristic taken into consideration during each color adjustment, are recorded into the section 305 in association with each other. The color adjustment was conducted while the soft proof image taking the characteristic of the printing apparatus 200 into consideration was being displayed on the display screen of the display unit 106, and hence the color adjustment parameter is a color adjustment parameter that depends on the printing characteristic of the specific printing apparatus 200.

Figure 4:
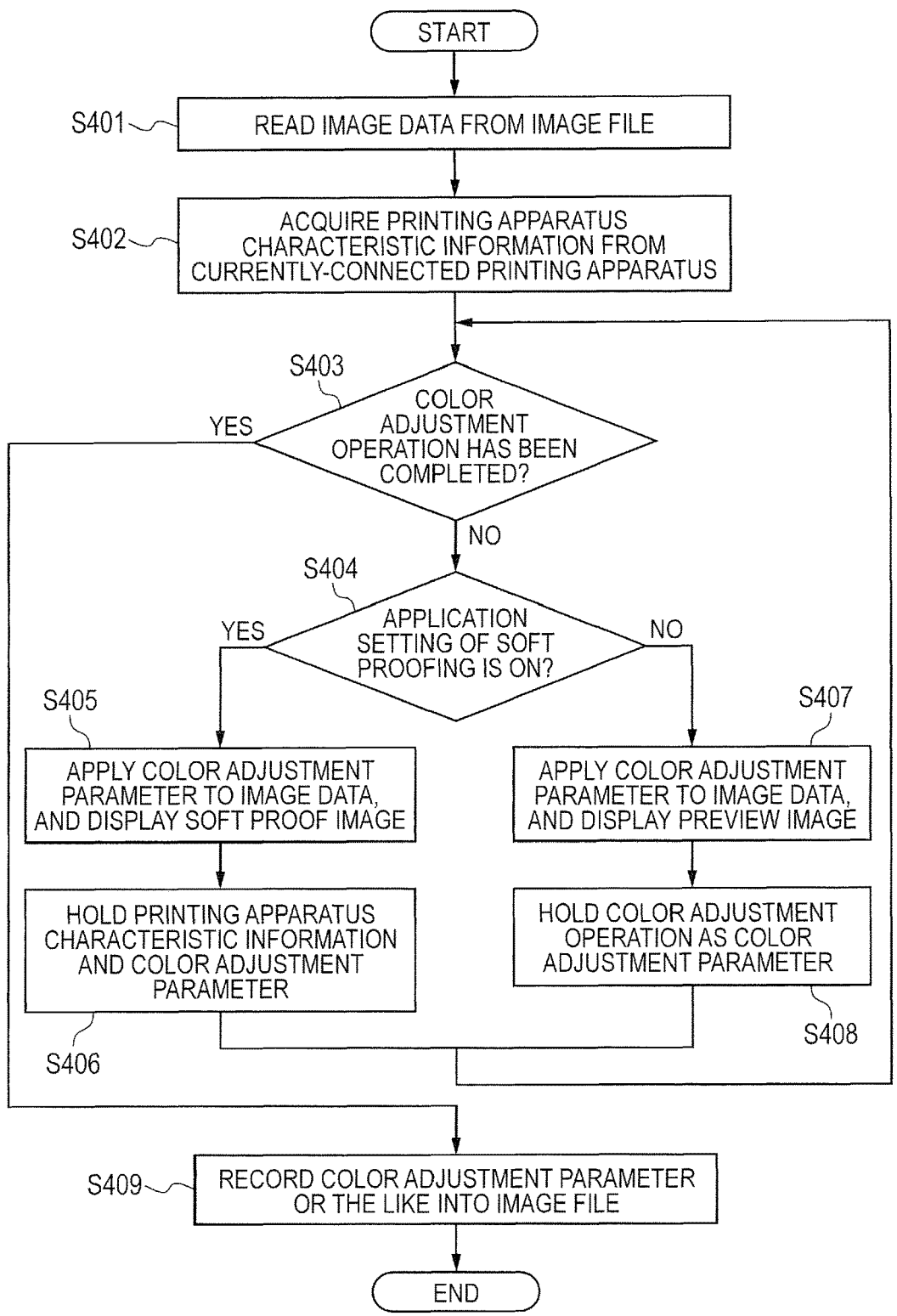
FIG. 4 is a flowchart for illustrating an operation of the image processing apparatus according to the first embodiment.

FIG. 4 is a flowchart for illustrating an operation of the image processing apparatus according to this embodiment.

First, the control unit 101 reads the image data from the image file (Step S401). More specifically, the control unit 101 reads an image file from the storage unit 104 or the like. Then, the control unit 101 acquires the image data from the read image file.

Subsequently, the control unit 101 acquires, from the printing apparatus 200 connected to the image processing apparatus 100, the printing apparatus characteristic information on the printing apparatus 200 (Step S402). Examples of the printing apparatus characteristic information include, as described above, the model name of the printing apparatus 200 and the profile data indicating the printing characteristic of the printing apparatus 200.

Subsequently, the control unit 101 determines whether or not the color adjustment operation by the user has been completed (Step S403). When the color adjustment operation by the user has not been completed (NO in Step S403), the procedure advances to Step S404.

In Step S404, the control unit 101 determines whether or not an application setting of the soft proofing is ON. The application setting of the soft proofing represents a setting indicating whether a soft proof image taking the characteristic of the printing apparatus 200 into consideration is to be displayed on the display screen of the display unit 106 or an image that has not taken the characteristic of the printing apparatus 200 into consideration is to be displayed on the display screen of the display unit 106. The image that has not taken the characteristic of the printing apparatus 200 into consideration represents an image that is not a soft proof image. When the application setting of the soft proofing is ON (YES in Step S404), the procedure advances to Step S405. When the application setting of the soft proofing is ON, only the soft proof image may be displayed on the display screen, or both the soft proof image and the image that is not a soft proof image may be displayed on the display screen. On the other hand, when the application setting of the soft proofing is OFF (NO in Step S404), the procedure advances to Step S407.

In Step S405, the control unit 101 applies the color adjustment parameter to the image data, and displays the soft proof image taking the characteristic of the currently-connected printing apparatus 200 into consideration on the display screen of the display unit 106. That is, the control unit 101 previews, on the display screen of the display unit 106, an image indicating how a printed matter to be obtained by being printed with the specific printing apparatus 200 is to appear when observed under observation illumination. When the user has conducted the color adjustment with the soft proof image being previewed on the display screen, the control unit 101 displays, on the display screen of the display unit 106, the soft proof image obtained by conducting a simulation based on contents of the color adjustment.

In Step S406, the control unit 101 conducts the following processing. That is, the control unit 101 causes the RAM 103 to hold the color adjustment parameter set when the color adjustment was conducted with the soft proof image being displayed on the display screen of the display unit 106 and the printing apparatus characteristic information on the currently-connected printing apparatus 200 in association with each other. After that, the procedure returns to Step S403.

On the other hand, in Step S407, the control unit 101 applies the color adjustment parameter to the image data without taking the characteristic of the printing apparatus 200 into consideration, and displays the image (preview image) to which the color adjustment parameter has been applied on the display screen of the display unit 106. When the user has conducted the color adjustment, the control unit 101 displays the image (preview image) adjusted based on the contents of the color adjustment on the display screen of the display unit 106.

In Step S408, the control unit 101 causes the RAM 103 to hold the color adjustment parameter. After that, the procedure returns to Step S403.

When the color adjustment operation by the user has been completed (YES in Step S403), the procedure advances to Step S409. In Step S409, the control unit 101 executes processing for recording the color adjustment parameter or the like into the image file. In a case where the color adjustment has been conducted with the soft proof image being displayed on the display screen of the display unit 106, the control unit 101 conducts the following processing. That is, in the above-mentioned case, the control unit 101 records the color adjustment parameter set during the color adjustment and the printing apparatus characteristic information indicating the printing characteristic of the printing apparatus 200 having the characteristic taken into consideration during the color adjustment, into the section 305 within the image file illustrated in FIG. 3 in association with each other. When the color adjustment has been conducted with the image being displayed on the display screen without the characteristic of the printing apparatus 200 being taken into consideration, the color adjustment parameter set during the color adjustment is recorded into the section 304 within the image file illustrated in FIG. 3.

Figure 5:
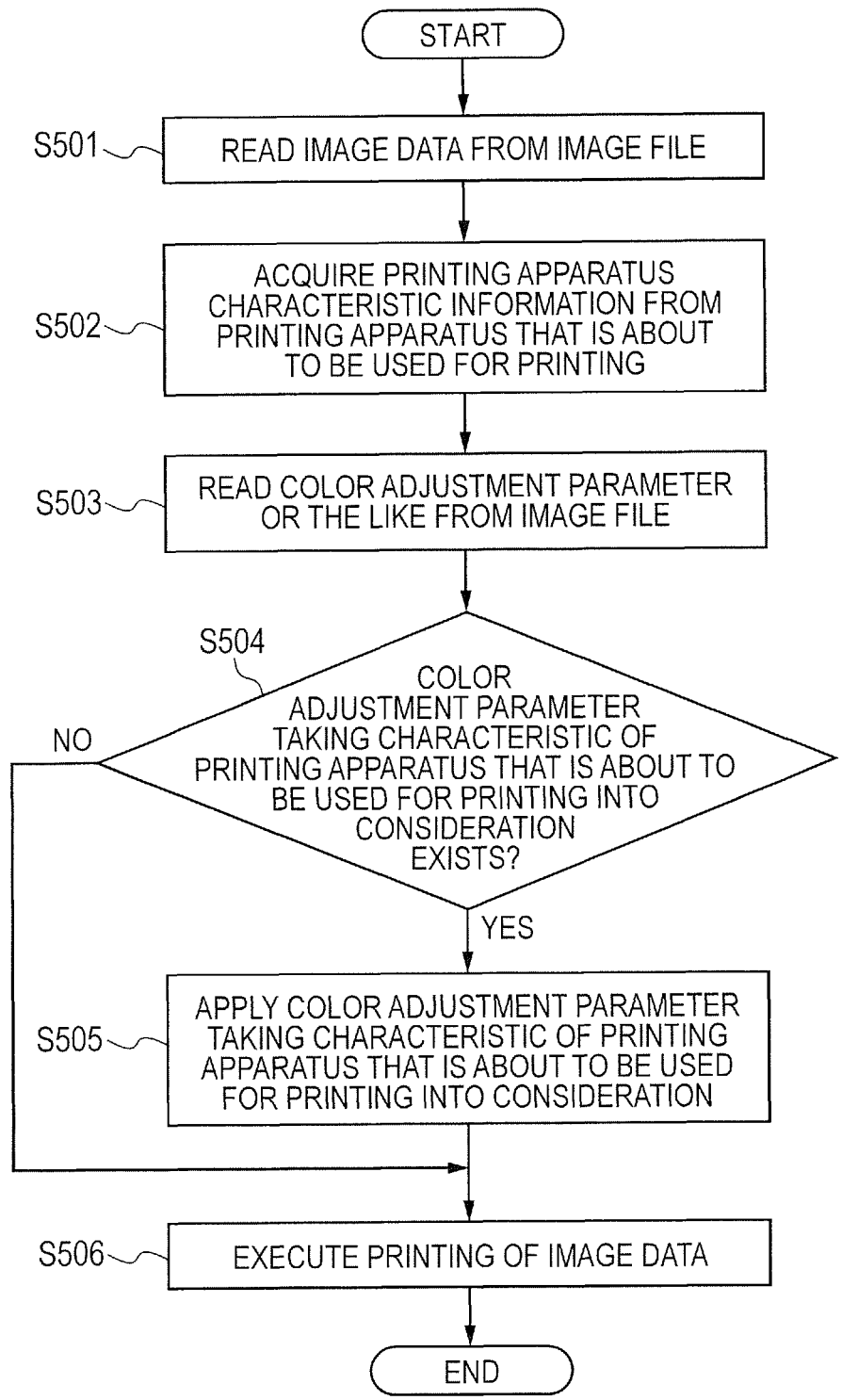
FIG. 5 is a flowchart for illustrating an operation of the printing apparatus according to the first embodiment.

FIG. 5 is a flowchart for illustrating an operation of the printing apparatus according to this embodiment. The operation of the printing apparatus 200 that is about to be used for the printing is described below.

First, the control unit 201 provided inside the printing apparatus 200 that is about to be used for the printing reads image data from an image file to be printed (Step S501).

Subsequently, the control unit 201 provided inside the printing apparatus 200 that is about to be used for the printing acquires the printing apparatus characteristic information on the printing apparatus 200 including the control unit 201 (Step S502). The printing apparatus characteristic information is stored in advance in, for example, the ROM 202 or the storage unit 204.

Subsequently, the control unit 201 provided inside the printing apparatus 200 that is about to be used for the printing reads the color adjustment parameter or the like from the image file (Step S503). Specifically, the control unit 201 reads the color adjustment parameter set when the color adjustment was conducted without taking the characteristic of the printing apparatus 200 into consideration. Specifically, the control unit 201 reads the color adjustment parameter recorded in the section 304 within the image file illustrated in FIG. 3. Further, in a case where the color adjustment parameter set when the color adjustment was conducted with the soft proof image being displayed and the printing apparatus characteristic information corresponding to the color adjustment parameter are recorded in the image file, the control unit 201 reads the color adjustment parameter and the printing apparatus characteristic information. Specifically, in a case where the color adjustment parameter and the printing apparatus characteristic information are recorded in the section 305 within the image file, the control unit 201 conducts the following processing. That is, in the above-mentioned case, the control unit 201 reads the color adjustment parameter and the printing apparatus characteristic information recorded in the section 305 within the image file illustrated in FIG. 3.

Subsequently, the control unit 201 provided inside the printing apparatus 200 that is about to be used for the printing determines whether or not the color adjustment parameter taking the characteristic of the printing apparatus 200 that is about to be used for the printing into consideration exists within the image file (Step S504). That is, the control unit 201 determines whether or not the color adjustment parameter set when the color adjustment was conducted while the soft proof image taking the characteristic of the printing apparatus 200 that was about to be used for the printing into consideration was being displayed exists within the image file. Specifically, the control unit 201 determines whether or not the color adjustment parameter and the printing apparatus characteristic information are recorded in the section 305 within the image file illustrated in FIG. 3. Then, the control unit 201 determines whether or not the color adjustment parameter is the color adjustment parameter taking the characteristic of the printing apparatus 200 that is about to be used for the printing into consideration based on the printing apparatus characteristic information corresponding to the color adjustment parameter. When the color adjustment parameter taking the characteristic of the printing apparatus 200 that is about to be used for the printing into consideration does not exist within the image file (NO in Step S504), the procedure advances to Step S506, and the color adjustment parameter is not applied to the image data. On the other hand, when the color adjustment parameter taking the characteristic of the printing apparatus 200 that is about to be used for the printing into consideration exists within the image file (YES in Step S504), the procedure advances to Step S505.

In Step S505, the control unit 201 applies the color adjustment parameter taking the characteristic of the printing apparatus 200 that is about to be used for the printing into consideration to the image data.

In Step S506, the control unit 201 executes printing processing, to thereby generate data for printing (print data) and output the generated data for the printing to the printing unit 206, and the printing unit 206 prints the image on a printing sheet based on the data for the printing. In this case, the printing processing represents processing for generating the data for the printing. In the printing processing, for example, resolution conversion processing such as interpolation or thinning-out is executed for the image data so that the data for the printing that has a desired resolution is obtained. Further, the image data that remains in an RGB format cannot be subjected to the printing, and is therefore converted into a CMYK format, which is a format that can be handled in printing, in the printing processing. Further, dither processing, error diffusion processing, or the like is executed for the image data in the printing processing, to thereby generate the data for the printing having a desired gradation.

Note that, the description is made above by taking an exemplary case where the printing apparatus 200 determines whether or not to apply the color adjustment parameter to the image data, but the present invention is not limited thereto. For example, instead of the printing apparatus 200, the image processing apparatus 100 may determine whether or not to apply the color adjustment parameter to the image data. Specifically, the image processing apparatus 100 reads the color adjustment parameter or the like from the image file to be printed, and acquires the characteristic information from the printing apparatus 200 to be used for the printing. Then, the image processing apparatus 100 determines, based on the information read from the image file and the information acquired from the printing apparatus 200, whether or not the color adjustment parameter taking the characteristic of the printing apparatus 200 into consideration exists within the image file. When the color adjustment parameter taking the characteristic of the printing apparatus 200 into consideration exists within the image file, the image processing apparatus 100 applies the color adjustment parameter to the image data, generates the data for the printing from the image data subjected to the color adjustment, and outputs the data for the printing to the printing apparatus 200. On the other hand, when the color adjustment parameter taking the characteristic of the printing apparatus 200 into consideration does not exist within the image file, the image processing apparatus 100 generates the data for the printing from the image data without applying the color adjustment parameter to the image data, and outputs the data for the printing to the printing apparatus 200.

Incidentally, the control unit 101 or the control unit 201 can also function as a warning unit configured to issue a warning based on a comparison between information relating to the selected printing apparatus 200 and the information relating to the printing apparatus 200 associated with the image data. For example, when the color adjustment parameter taking the characteristic of the printing apparatus 200 into consideration does not exist within the image file, the control unit 101 or the control unit 201 can issue a warning to the user. The warning can be issued through, for example, the displaying of a message on a screen of the display unit 106.

In this manner, according to this embodiment, in a case where the color adjustment parameter taking the characteristic of the printing apparatus that is about to be used for the printing into consideration exists, the color adjustment parameter is applied when the image is printed. Meanwhile, the color adjustment parameter taking the characteristic of another printing apparatus having a characteristic different from that of the printing apparatus that is about to be used for the printing into consideration is not applied when the image is printed. Thus, according to this embodiment, an unintended color adjustment can be prevented from being applied. Therefore, according to this embodiment, the printed matter having an appearance equivalent to that of the soft proof image displayed on the display screen of the display unit can be obtained more reliably.

Second Embodiment

Figure 6:
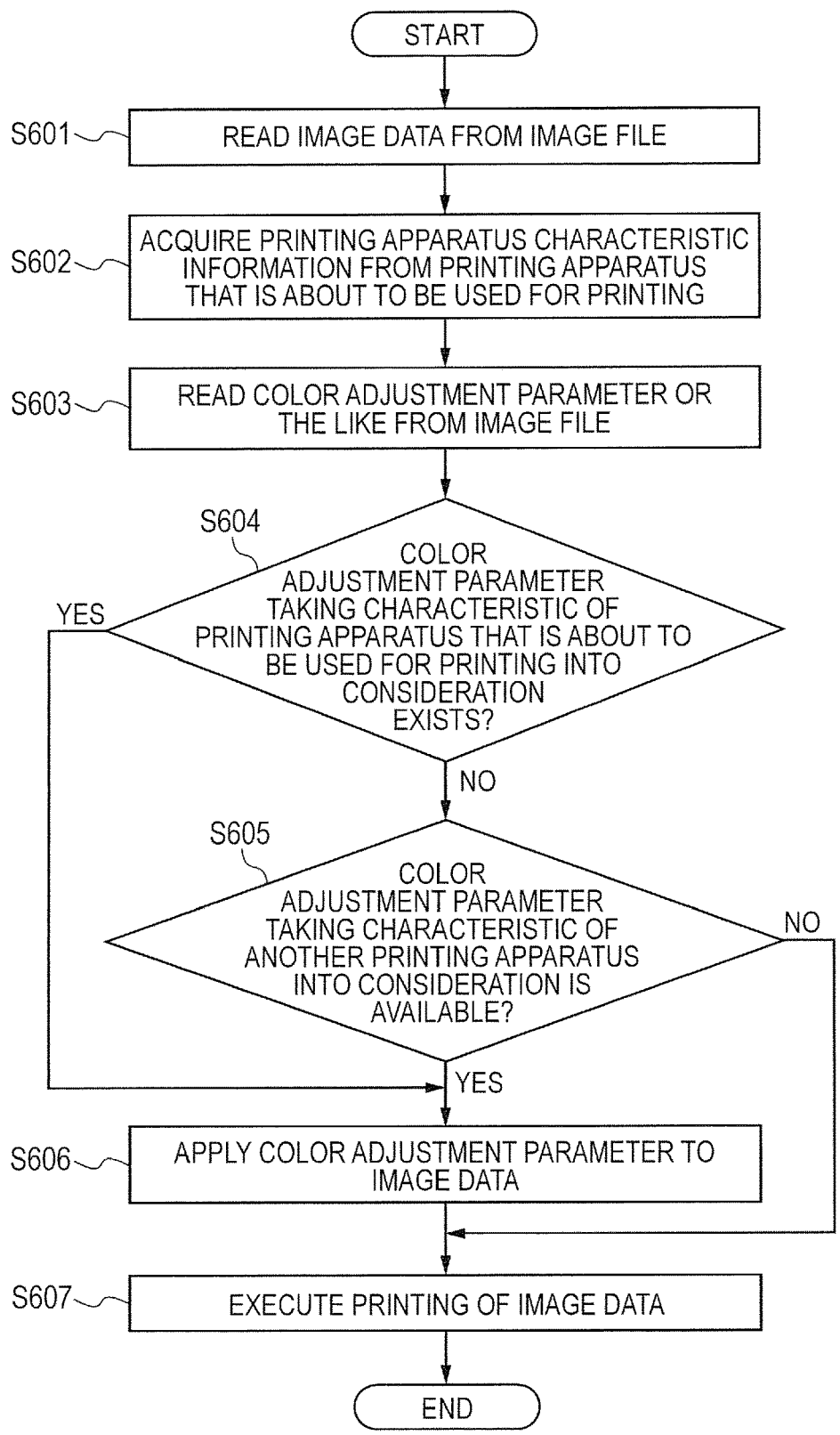
FIG. 6 is a flowchart for illustrating an operation of a printing apparatus according to a second embodiment.

An image processing apparatus, an image processing method, a printing apparatus, a printing method, and a computer program according to a second embodiment of the present invention are described with reference to FIG. 6. The same components as those of the image processing apparatus, the printing apparatus, and the like according to the first embodiment described with reference to FIGS. 1 to 5 are denoted by like reference numerals to omit or simplify the description.

Basic configurations of the image processing apparatus 100 and the printing apparatus 200 that form an image forming system according to this embodiment are the same as those of the image processing apparatus 100 and the printing apparatus 200 according to the first embodiment that have been described above.

In a case where the color adjustment parameter taking the characteristic of a printing apparatus that is about to be used for the printing into consideration is not included in the image file and where the color adjustment parameter taking the characteristic of another printing apparatus having a characteristic different from that of the printing apparatus into consideration is included in the image file, the following processing is conducted. That is, in the above-mentioned case, the control unit 201 determines, in the following manner, whether or not the color adjustment parameter taking the characteristic of another printing apparatus 200 into consideration is available when the image is printed by the printing apparatus 200 that is about to be used for the printing. That is, the control unit 201 generates a first image being a soft proof image to which the color adjustment parameter taking the characteristic of another printing apparatus 200 into consideration has been applied, and which takes the characteristic of the printing apparatus 200 that is about to be used for the printing of the image into consideration. Further, the control unit 201 generates a second image being a soft proof image to which the color adjustment parameter that has not taken the characteristic of any one of the printing apparatus 200 into consideration has been applied, and which takes the characteristic of the printing apparatus 200 that is about to be used for the printing of the image into consideration. In this case, the color adjustment parameter that has not taken the characteristic of any one of the printing apparatus 200 into consideration represents a color adjustment parameter set when the color adjustment was conducted without the soft proof image being displayed. Then, the control unit 201 calculates the color difference between the above-mentioned first image and a third image (image to be a target) to which the color adjustment parameter that has not taken the characteristic of any one of the printing apparatus 200 into consideration has been applied, and which is not the soft proof image. Further, the control unit 201 calculates a color difference between the above-mentioned third image and the above-mentioned second image. When the color difference between the third image and the first image is smaller than the color difference between the third image and the second image, the control unit 201 applies the color adjustment parameter taking the characteristic of another printing apparatus 200 into consideration when the image is printed.

The control unit 201 conducts the following processing when a plurality of color adjustment parameters respectively taking the characteristics of a plurality of other printing apparatus 200, which have characteristics different from that of the printing apparatus 200 that is about to be used for the printing of the image, into consideration are recorded in the image file. That is, the control unit 201 selects such a color adjustment parameter as to minimize the above-mentioned color difference between the third image and the first image from among the plurality of color adjustment parameters respectively taking the characteristics of the plurality of other printing apparatus into consideration, and applies the color adjustment parameter when the image is printed.

Next, an operation of the printing apparatus according to this embodiment is described with reference to FIG. 6. FIG. 6 is a flowchart for illustrating the operation of the printing apparatus according to this embodiment.

First, Step S601 to Step S603 are the same as Step S501 to Step S503 described above with reference to FIG. 5, and hence descriptions thereof are omitted.

Subsequently, the control unit 201 provided inside the printing apparatus 200 that is about to be used for the printing determines whether or not the color adjustment parameter taking the characteristic of the printing apparatus 200 that is about to be used for the printing of the image into consideration exists within the image file (Step S604). When the color adjustment parameter taking the characteristic of the printing apparatus 200 that is about to be used for the printing into consideration does not exist within the image file (NO in Step S604), the procedure advances to Step S605. On the other hand, when the color adjustment parameter taking the characteristic of the printing apparatus 200 that is about to be used for the printing into consideration exists within the image file (YES in Step S604), the procedure advances to Step S606.

In Step S605, in a case where the color adjustment parameter taking the characteristic of another printing apparatus 200 having a characteristic different from that of the printing apparatus 200 that is about to be used for the printing of the image into consideration is included in the image file, the control unit 201 conducts the following processing. That is, in the above-mentioned case, the control unit 201 determines whether or not the color adjustment parameter taking the characteristic of another printing apparatus 200 into consideration is available when the image is printed by the printing apparatus 200 that is about to be used for the printing. Specifically, the control unit 201 generates the first image being the soft proof image to which the color adjustment parameter taking the characteristic of another printing apparatus 200 into consideration has been applied, and which takes the characteristic of the printing apparatus 200 that is about to be used for the printing into consideration. Further, the control unit 201 generates the second image being the soft proof image to which the color adjustment parameter that has not taken the characteristic of any one of the printing apparatus 200 into consideration has been applied, and which takes the characteristic of the printing apparatus 200 that is about to be used for the printing of the image into consideration. Then, the control unit 201 calculates the color difference between the first image and the third image (image to be a target) to which the color adjustment parameter that has not taken the characteristic of any one of the printing apparatus 200 into consideration has been applied, and which is not the soft proof image. Further, the control unit 201 calculates the color difference between the third image and the second image. In a case where the color difference between the third image and the first image is smaller than the color difference between the third image and the second image, the control unit 201 determines that the color adjustment parameter taking the characteristic of another printing apparatus 200 into consideration is available when the image is printed. At this time, when a plurality of color adjustment parameters respectively taking the characteristics of a plurality of other printing apparatus 200, which have characteristics different from that of the printing apparatus 200 that is about to be used for the printing of the image, into consideration are recorded in the image file, the control unit 201 conducts the following processing. That is, the control unit 201 selects such a color adjustment parameter as to minimize the color difference between the third image and the first image from among the plurality of color adjustment parameters respectively taking the characteristics of the plurality of other printing apparatus into consideration, and applies the color adjustment parameter.

In a case where the color adjustment parameter taking the characteristic of another printing apparatus 200 into consideration is available when the image is printed by the printing apparatus 200 that is about to be used for the printing (YES in Step S605), the procedure advances to Step S606. On the other hand, in a case where the color adjustment parameter taking the characteristic of another printing apparatus 200 into consideration is not available when the image is printed by the printing apparatus 200 that is about to be used for the printing (NO in Step S605), the control unit 201 conducts the following processing. That is, in the above-mentioned case, the control unit 201 notifies (warns) the user that an appropriate color adjustment parameter is not applied, and the procedure advances to Step S607.

In Step S606, the color adjustment parameter is applied to the image data. When the color adjustment parameter taking the characteristic of the printing apparatus 200 that is about to be used for the printing into consideration exists, that is, when YES is determined in Step S604, the control unit 201 applies the color adjustment parameter to the image data. In a case where the color adjustment parameter taking the characteristic of another printing apparatus 200 into consideration is available when the image is printed by the printing apparatus 200 that is about to be used for the printing, that is, in a case where YES is determined in Step S605, the control unit 201 conducts the following processing. That is, in the above-mentioned case, the control unit 201 applies the color adjustment parameter, which is determined to be available, to the image data. In a case where a plurality of color adjustment parameters respectively taking the characteristics of a plurality of other printing apparatus 200, which have characteristics different from that of the printing apparatus 200 that is about to be used for the printing of the image, into consideration are recorded in the image file, the control unit 201 conducts the following processing. That is, in the above-mentioned case, the control unit 201 selects such a color adjustment parameter as to minimize the color difference between the third image and the first image from among the plurality of color adjustment parameters respectively taking the characteristics of a plurality of other printing apparatus into consideration, and applies the color adjustment parameter to the image data.

In Step S607, the control unit 201 causes the printing unit 206 to execute the printing of the image data.

In this manner, according to this embodiment, even in the case where the color adjustment parameter taking the printing characteristic of the printing apparatus that is about to be used for the printing into consideration does not exist within the image file, when another color adjustment parameter that is available exists, the another color adjustment parameter is used. Therefore, according to this embodiment, even when the color adjustment parameter taking the printing characteristic of the printing apparatus 200 that is about to be used for the printing of the image into consideration does not exist, a satisfactory color adjustment can be applied. Therefore, according to this embodiment, the printed matter having an appearance equivalent to that of the soft proof image displayed on the display screen of the display unit can be obtained more reliably.

Third Embodiment

An image processing apparatus, an image processing method, a printing apparatus, a printing method, and a computer program according to a third embodiment of the present invention are described with reference to FIG. 7. The same components as those of the image processing apparatus, the printing apparatus, and the like according to the first or second embodiment described with reference to FIGS. 1 to 6 are denoted by like reference numerals to omit or simplify the description.

Basic configurations of the image processing apparatus 100 and the printing apparatus 200 that form an image forming system according to this embodiment are the same as those of the image processing apparatus 100 and the printing apparatus 200 according to the first or second embodiment that have been described above.

In a case where display screen characteristic information indicating a display characteristic of the display screen of the display unit 106 used when the soft proof image is displayed is recorded in the image file in association with the color adjustment parameter and the printing apparatus characteristic information, the control unit 201 conducts the following processing. That is, in the above-mentioned case, the control unit 201 determines whether or not a color gamut that can be expressed by the display screen of the display unit 106 is narrower than a color gamut that can be expressed by the printing apparatus 200 based on the printing apparatus characteristic information.

In a case where the color gamut that can be expressed by the display screen of the display unit 106 is narrower than the color gamut that can be expressed by the printing apparatus 200, the control unit 201 provided inside the printing apparatus 200 applies color gamut conversion processing taking the display characteristic of the display screen of the display unit 106 into consideration when the image is printed.

In this embodiment, when the color adjustment parameter and the printing apparatus characteristic information are recorded into the image file in association with each other in Step S409 illustrated in FIG. 4, the control unit 101 of the image processing apparatus 100 conducts the following processing. That is, in Step S409 illustrated in FIG. 4, the display screen characteristic information indicating the display characteristic of the display screen of the display unit 106 of the image processing apparatus 100 used when the soft proof image is displayed is also recorded into the image file in association with the color adjustment parameter and the printing apparatus characteristic information.

Figure 7:
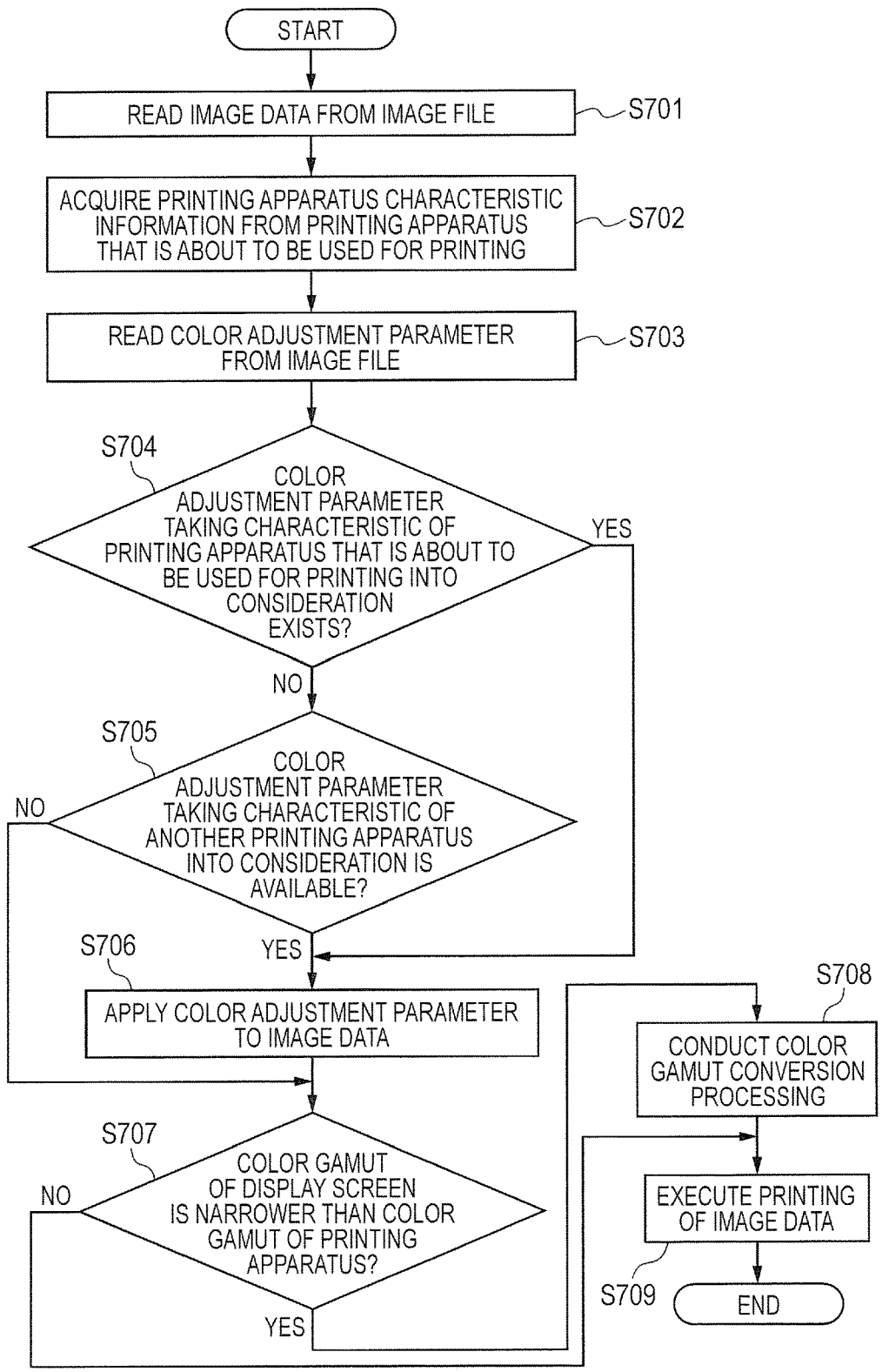
FIG. 7 is a flowchart for illustrating an operation of a printing apparatus according to a third embodiment.

FIG. 7 is a flowchart for illustrating the operation of the printing apparatus according to this embodiment.

First, Step S701 to Step S706 are the same as Step S601 to Step S606 described above with reference to FIG. 6 and hence descriptions thereof are omitted.

Subsequently, in a case where the display screen characteristic information indicating the display characteristic of the display screen of the display unit 106 used when the soft proof image is displayed is recorded in the image file in association with the color adjustment parameter and the printing apparatus characteristic information, the control unit 201 conducts the following processing. That is, in the above-mentioned case, the control unit 201 determines whether or not the color gamut that can be expressed by the display screen of the display unit 106 is narrower than the color gamut that can be expressed by the printing apparatus 200 based on the printing apparatus characteristic information.

In the case where the color gamut that can be expressed by the display screen of the display unit 106 of the image processing apparatus 100 is narrower than the color gamut that can be expressed by the printing apparatus 200 (YES in Step S707), the control unit 201 conducts the following processing. That is, in the above-mentioned case, the control unit 201 executes the color gamut conversion processing taking the display characteristic of the display screen of the display unit 106 into consideration (Step S708). After that, the procedure advances to Step S709.

On the other hand, when the color gamut that can be expressed by the display screen of the display unit 106 of the image processing apparatus 100 is not narrower than the color gamut that can be expressed by the printing apparatus 200 (NO in Step S707), the procedure advances to Step S709.

In Step S709, the control unit 201 causes the printing unit 206 to execute the printing of the image data.

In this manner, according to this embodiment, when the color gamut that can be expressed by the display screen of the display unit 106 of the image processing apparatus 100 is narrower than the color gamut that can be expressed by the printing apparatus 200, the color gamut conversion processing is executed. Therefore, according to this embodiment, even when the color gamut of the display screen of the display unit 106 of the image processing apparatus 100 is narrower than the color gamut of the printing apparatus 200, a satisfactory image can be formed. Therefore, according to this embodiment, the printed matter having an appearance equivalent to that of the soft proof image displayed on the display screen of the display unit can be obtained more reliably.

Fourth Embodiment

Figure 8:
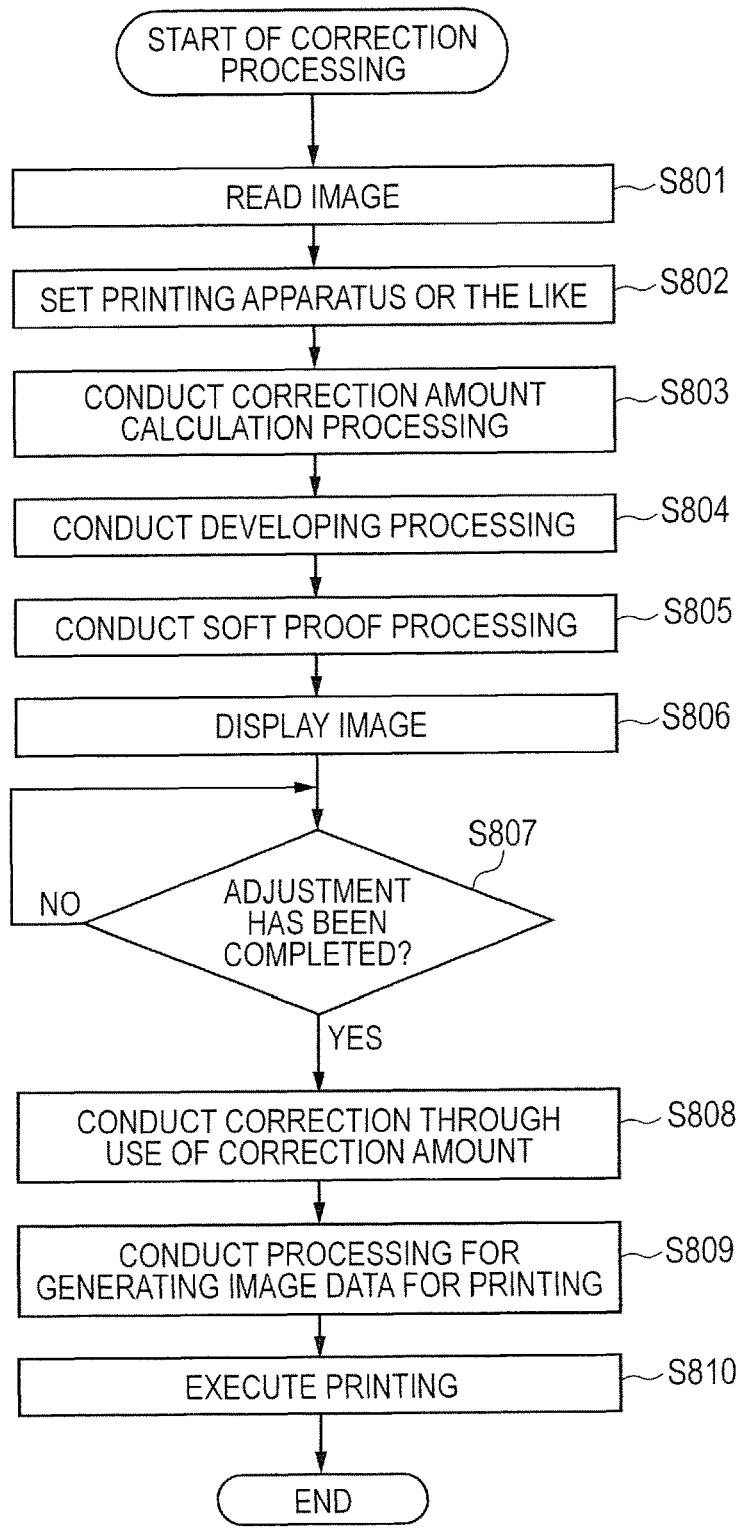
FIG. 8 is a flowchart for illustrating an operation of an image processing apparatus according to a fourth embodiment.

An image processing apparatus, an image processing method, and a computer program according to a fourth embodiment of the present invention are described with reference to FIG. 8. The same components as those of the image processing apparatus and the like according to any one of the first to third embodiments described with reference to FIGS. 1 to 7 are denoted by like reference numerals to omit or simplify the description.

The control unit 101 realizes various functions described below by expanding a predetermined application program or the like stored in the storage unit 104 into the RAM 103 and executing the predetermined application program or the like. Specifically, the control unit 101 can function as an image input unit, an image generation unit, an image display unit, an image processing execution unit, the soft proof image generation unit, a characteristic information acquisition unit, an image correction amount determination unit, and the like.

The control unit 101 can function as the image input unit configured to read the image data from the storage unit 104 and store the image data into the RAM 103.

When the image data is RAW data, the image data needs to be converted into a format that can be displayed on the display screen of the display unit 106. This conversion is referred to as "developing processing". The control unit 101 can function as the image generation unit configured to conduct the developing processing for the RAW data.

The control unit 101 can also function as the image display unit configured to cause the display unit 106 to display the image for which the developing processing has been completed.

The control unit 101 can also function as an adjustment unit configured to conduct the adjustment for the image (adjustment processing), that is, the image processing execution unit configured to execute the image processing.

The control unit 101 can also function as the soft proof image generation unit configured to generate the soft proof image taking the characteristic of the printing apparatus into consideration. The control unit 101 generates the soft proof image based on the printing characteristic (profile) of the printing apparatus 200 to be used for the printing, the characteristic (profile) of a sheet to be used for the printing, and the like. With this operation, an image having a color and a luminance that are equal to those of a printed matter to be actually formed can be displayed on the display screen of the display unit 106. The user can confirm the appearance of the printed matter to be actually formed or the like on the display screen of the display unit 106.

The control unit 101 can also function as the characteristic information acquisition unit configured to acquire the information (characteristic information) relating to the printing apparatus 200. Examples of the characteristic information relating to the printing apparatus 200 include the model (type) of the printing apparatus 200 to be used for the printing, a type (sheet type) of the sheet to be used for the printing, a size (sheet size type) of the sheet to be used for the printing, an ink type, and printing quality. Such characteristic information relating to the printing apparatus 200 can be acquired based on a setting of a printer driver, a setting of a user interface, and the like.

The control unit 101 also functions as a correction amount determination unit configured to determine a correction amount based on the characteristic information relating to the printing apparatus 200. Such a correction amount serves to correct an adjustment value set when the adjustment of the image was conducted with the soft proof image being displayed on the display screen of the display unit 106. Various kinds of adjustments are conducted for the image processing. Therefore, it is preferred that such a correction amount be determined for each adjustment value. The description is made below by taking the correction amount for correcting an adjustment value for sharpness as an example. The control unit 101 determines the correction amount for correcting the adjustment value for sharpness based on the characteristic information relating to the printing apparatus 200. Specifically, the correction amount for correcting the adjustment value for sharpness is determined based on the model of the printing apparatus 200, a printing resolution of the printing apparatus 200, the sheet type of the sheet to be used for the printing, the sheet size type of the sheet to be used for the printing, the ink type, the printing quality, and the like.

The control unit 101 also functions as a correction unit configured to correct the adjustment value set when the adjustment of the image was conducted with the soft proof image being displayed on the display screen of the display unit 106 through use of the correction amount determined based on the characteristic information relating to the printing apparatus 200. The control unit 101 generates the image data by correcting the adjustment value set when the adjustment of the image was conducted with the soft proof image being displayed on the display screen of the display unit 106 through use of such a correction amount. The printing apparatus 200 uses the image data generated in this manner to print the image. Therefore, the printed matter having an appearance equivalent to that of the soft proof image displayed on the display unit 106 can be formed.

In this embodiment, a look-up table is stored in advance in the storage unit 104 or the like. The control unit 101 refers to the look-up table for correction amounts corresponding to various kinds of characteristic information (parameters) relating to the printing apparatus 200, to thereby determine such a correction amount. Otherwise, the control unit 101 may determine such a correction amount by calculating such a correction amount based on the various kinds of characteristic information (parameters) relating to the printing apparatus 200.

Next, an operation of the image processing apparatus according to this embodiment is described with reference to FIG. 8. FIG. 8 is a flowchart for illustrating the operation of the image processing apparatus according to this embodiment.

When an application program for conducting a desired adjustment is selected through the user's operation of the operation unit 105, the control unit 101 reads the application program from the storage unit 104 or the like, and executes the application program. With this operation, for example, a user interface screen for adjusting the sharpness or the like of the image is displayed on the display screen of the display unit 106.

Based on the user's operation of the operation unit 105, the control unit 101 reads image data to be subjected to the image processing from, for example, the storage unit 104 (Step S801). The image data is, for example, image data before being subjected to the developing processing, namely, RAW data. The control unit 101 stores the image data read from the storage unit 104 into the RAM 103.

Subsequently, the control unit 101 conducts a setting relating to the printing apparatus 200 (Step S802). Examples of the setting relating to the printing apparatus 200 include the model of the printing apparatus 200, the printing resolution, the sheet type, the sheet size type, the ink type, and the printing quality. Those pieces of setting information are used when an output profile is determined in soft proof processing to be conducted in Step S805. Further, those pieces of setting information are also used for correction amount calculation processing to be conducted in Step S803.

Subsequently, the control unit 101 conducts the correction amount calculation processing (Step S803). The correction amount calculation processing is described in detail with reference to FIG. 9.

Subsequently, the control unit 101 conducts the developing processing for the RAW data (Step S804). With this operation, the RAW data read in Step S801 is developed to become the image data having a format that can be displayed on the display screen of the display unit 106.

Subsequently, the control unit 101 executes the soft proof processing (Step S805). In the soft proof processing, the control unit 101 converts a color space through use of the output profile of the printing apparatus 200.

Subsequently, the control unit 101 displays the soft proof image on the display screen of the display unit 106 (Step S806).

Subsequently, the user conducts an adjustment (editing) of the image while viewing the display screen on which the soft proof image is displayed (Step S807). For example, the user sets an application amount of the sharpness. When the adjustment of the image has not been completed (NO in Step S807), Step S807 is repeatedly conducted. When the adjustment of the image has been completed (YES in Step S807), the procedure advances to Step S808.

In Step S808, the control unit 101 corrects the adjustment value set in Step S807 through use of the correction amount determined in advance in Step S803. Specifically, the control unit 101 corrects the application amount of the sharpness set in Step S807 through the use of the correction amount determined in advance in Step S803. Such a correction is made because influences of the type of the sheet to be used for the printing, the size of the sheet, and the like are not appropriately reflected in the image displayed on the display screen.

Subsequently, the control unit 101 generates image data for printing (Step S809). The image data in which the correction made in Step S808 has been reflected is generated as the image data for the printing.

Finally, when the control unit 101 transmits the image data for the printing to the printing apparatus 200, the control unit 201 provided inside the printing apparatus 200 executes the printing (Step S810).

As a result, the image generating processing according to this embodiment is brought to an end.

Figure 9:
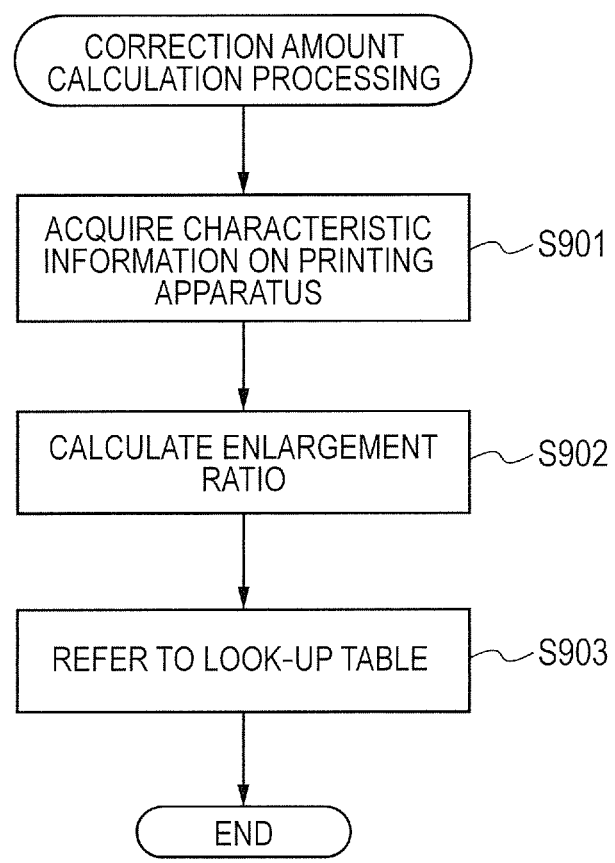
FIG. 9 is a flowchart for illustrating an operation of the image processing apparatus according to the fourth embodiment.

Next, the correction amount calculation processing is described with reference to FIG. 9. FIG. 9 is a flowchart for illustrating the correction amount calculation processing according to this embodiment.

First, the control unit 101 acquires characteristic information on the printing apparatus 200 that is about to be used for the printing (Step S901). For example, the characteristic information on the printing apparatus 200 is set in advance in the image processing apparatus 100 in Step S802. Note that, when the characteristic information on the printing apparatus 200 is not set in Step S802, for example, the user interface screen may be displayed in the display unit 106 to allow the user to conduct the setting through use of the user interface screen.

Subsequently, the control unit 101 calculates an enlargement ratio (Step S902). The enlargement ratio indicates to which degree the size of an image to be subjected to the image processing is to be actually enlarged. The enlargement ratio is calculated based on the resolution or the like of the printing apparatus 200 obtained from the characteristic information on the printing apparatus 200.

Subsequently, the control unit 101 refers to the look-up table to determine the correction amount (Step S903). Such a correction amount is used to correct the adjustment value in Step S808 described above.

The enlargement ratio of the image, a size of one dot involved in the printing conducted by the printing apparatus 200, a degree of bleeding of ink droplets corresponding to the sheet type, and the like are taken into consideration when the correction amount is determined. An enlargement ratio factor is set so that the application amount of the sharpness or the like after the correction becomes two times when the enlargement ratio of the image is two times in each of a vertical direction and a lateral direction. A granular feeling sensed by human eyes differs depending on the size of one dot involved in the printing. Therefore, the size of one dot involved in the printing is set as an ink droplet size factor. Further, when the printing is conducted on a sheet exhibiting a large amount of bleeding of ink droplets, the effect of the sharpness decreases. Therefore, a bleeding factor is set based on the sheet type. Those factors are multiplied by one another to calculate how much correction amount is to be used. In this embodiment, in order to realize efficient image processing, a look-up table indicating a relationship between the enlargement ratio and the correction amount is referred to, to thereby determine the correction amount. In this case, the effect of the sharpness greatly changes due to the bleeding of ink droplets, and hence the look-up table suitably has a classification based on the sheet type.

In this manner, according to this embodiment, the adjustment value set when the adjustment of the image was conducted with the soft proof image taking the characteristic of the printing apparatus into consideration being displayed on the display screen is corrected through the use of the correction amount determined based on the characteristic information relating to the printing apparatus or the like. Therefore, according to this embodiment, the printed matter having an appearance equivalent to that of the soft proof image displayed on the display unit 106 can be obtained. In addition, according to this embodiment, the above-mentioned processing is applied in the stage of RAW development, and hence it is possible to suppress deterioration of the image to a minimum.

Fifth Embodiment

An image processing apparatus, an image processing method, and a computer program according to a fifth embodiment of the present invention are described with reference to FIG. 10. The same components as those of the image processing apparatus and the like according to any one of the first to fourth embodiments described with reference to FIGS. 1 to 9 are denoted by like reference numerals to omit or simplify the description.

The image processing apparatus according to this embodiment is configured to also display a full-scale image on the display screen of the display unit 106 when the soft proof image is displayed on the display screen of the display unit 106.

The control unit 101 can also function as a resolution conversion unit configured to conduct resolution conversion of an image based on the enlargement ratio of an image to be actually printed. With the operation of such resolution conversion, a full-scale soft proof image can be displayed on the display screen of the display unit 106.

Further, the control unit 101 can also function as a unit configured to control the display unit 106 to display the full-scale soft proof image for the image subjected to the resolution conversion on the display screen of the display unit 106.

Figure 10:
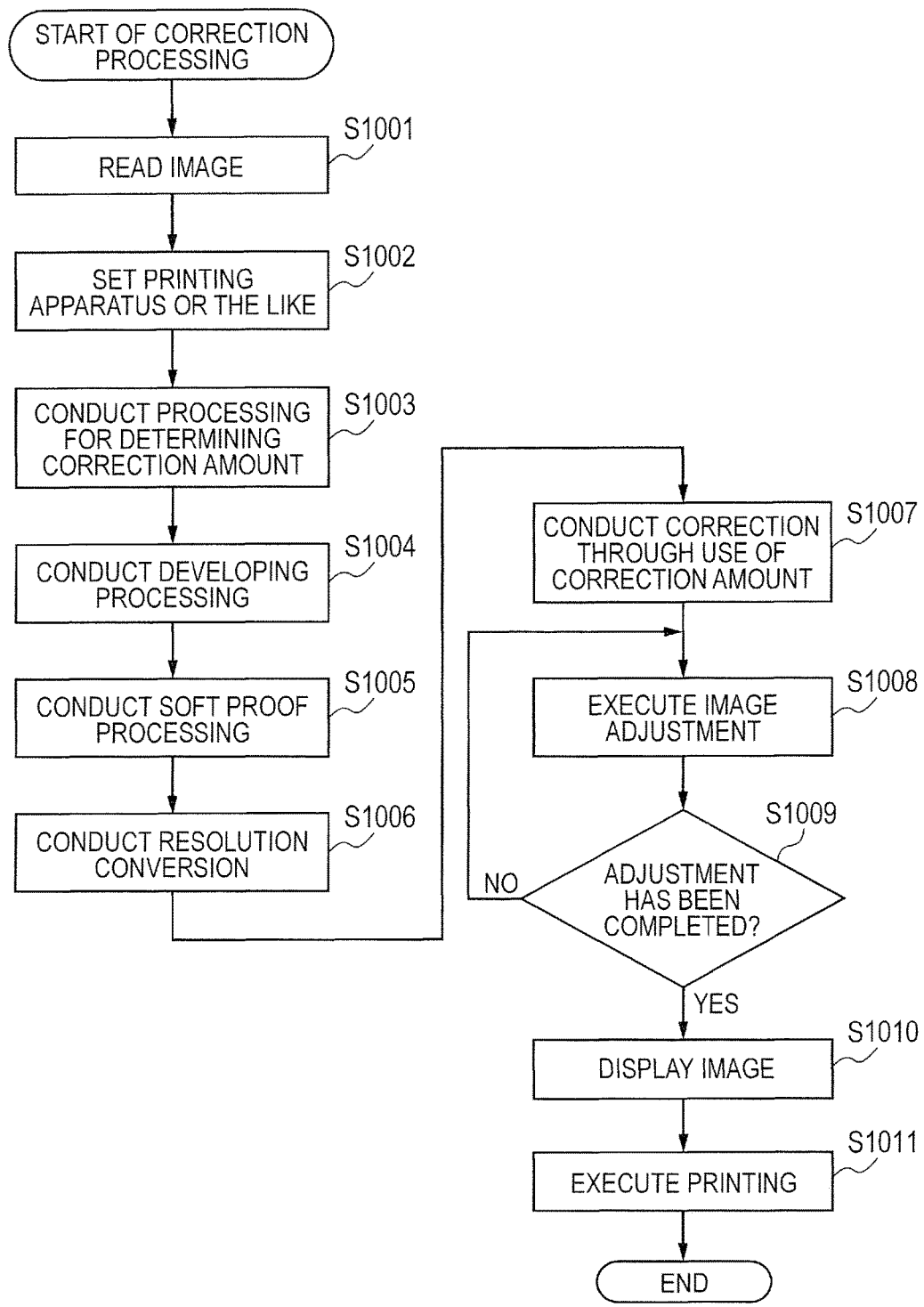
FIG. 10 is a flowchart for illustrating an operation of an image processing apparatus according to a fifth embodiment.

FIG. 10 is a flowchart for illustrating the operation of the image processing apparatus according to this embodiment.

First, Step S1001 to Step S1005 are the same as Step S801 to Step S805 described above with reference to FIG. 8, and hence descriptions thereof are omitted.

Subsequently, the control unit 101 conducts the resolution conversion (Step S1006). The size of the image to be actually printed is uniquely determined because the printing apparatus 200 has already been set. The control unit 101 conducts the resolution conversion so as to enable the full-scale image to be displayed on the display screen of the display unit 106. When the resolution conversion is conducted, the interpolation processing or the like is appropriately conducted (Step S1006). In this manner, the image data for displaying the full-scale image on the display unit 106 is generated.

Subsequently, the control unit 101 corrects the image data for displaying the full-scale image through the use of the correction amount determined in Step S1003.

After that, the user conducts the image processing, that is, the adjustment of the image (Step S1008). When the adjustment of the image has not been completed (NO in Step S1009), the procedure returns to Step S1008. On the other hand, when the adjustment of the image has been completed (YES in Step S1009), the procedure advances to Step S1010.

In Step S1010, the control unit 101 causes the display unit 106 to display the image subjected to the adjustment on the display screen of the display unit 106. The control unit 101 causes the display unit 106 to display the soft proof image having a general size and the full-scale soft proof image on the display screen of the display unit 106.

Subsequently, the control unit 101 causes the printing apparatus 200 to execute the printing (Step S1011). In the same manner as in the fourth embodiment, also in this embodiment, the application amount of the sharpness or the like is corrected through the use of the correction amount determined based on the characteristic information relating to the printing apparatus 200. Therefore, when the printing is conducted by the printing apparatus 200 through use of the image data formed in this manner, the printed matter having an appearance equivalent to that of the soft proof image displayed on the display unit 106 can be obtained.

In this manner, according to this embodiment, a general soft proof image is displayed on the display screen of the display unit 106, and at the same time, the full-scale soft proof image is also displayed on the display screen of the display unit 106. Therefore, according to this embodiment, a finished appearance of the printed matter to be actually formed can be previewed on the display screen with higher accuracy.

The embodiments of the present invention have been described above in detail, but the present invention is not limited to the above-mentioned embodiments. Various embodiments modified within the scope that does not depart from the gist of the invention are also included in the present invention.

The first to third embodiments are described by taking the color adjustment as an example, but the adjustment is not limited to the color adjustment. For example, another adjustment such as an adjustment of a contrast or the adjustment of the sharpness may be employed. When the adjustment has been conducted with the soft proof image being displayed on the display screen, an adjustment parameter corresponding to contents of the adjustment is recorded into the image file in association with the printing apparatus characteristic information.

Further, the fourth and fifth embodiments are described by taking an exemplary case where the application amount (adjustment value) of the sharpness is corrected through the use of the correction amount, but the adjustment value to be corrected is not limited to the adjustment value relating to the sharpness.

Further, the fourth and fifth embodiments are described by taking the processing conducted when the RAW data is developed as an example, but the present invention is not limited thereto. For example, the image processing method according to the fourth or fifth embodiment may be applied when the image processing or the like is conducted for TIFF data, JPEG data, or the like.

Further, the above-mentioned embodiments are described by taking an exemplary case where the printing is conducted in a state in which the image processing apparatus 100 and the printing apparatus 200 are connected to each other, but the present invention is not limited thereto. The printing can also be conducted in a state in which the image processing apparatus 100 is not connected to the printing apparatus 200. For example, after the image file is stored in advance in the storage unit 204 that can be inserted or removed, the storage unit 204 may be inserted into the printing apparatus 200, and the control unit 201 may read the image file from the inserted storage unit 204, to thereby conduct the printing of the image.

Further, parts of the above-mentioned embodiments may be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-106459, filed May 26, 2015, and Japanese Patent Application No. 2016-088140, filed Apr. 26, 2016, which are hereby incorporated by reference herein in their entirety.

What is claimed is:

1. An image processing apparatus comprising:
 a processor; and
 a memory storing a program which, when the program is executed by the processor, causes the image processing apparatus to:
 execute color adjustment processing for an image according to a user manipulation;
 generate a first soft proof image based on the image, a color adjustment parameter used in the color adjustment processing for the image according to a user manipulation, and taking into consideration the first characteristic information relating to a printing apparatus;
 display the first soft proof image on a screen;
 store the first color adjustment parameter used in the color adjustment processing that is performed while the first soft proof image is being displayed on the screen, taking into consideration the first characteristic information relating to the printing apparatus, and associate the first color adjustment parameter used in color adjustment with the image;

select a printing apparatus to be used for printing of the image and acquire a second characteristic information relating to the printing apparatus to be used for printing of an image from the printing apparatus;

determine whether or not the first characteristic information and the second characteristic information match each other;

in the event that there is no match, perform analysis to determine whether the first color adjustment parameter, taking into consideration the characteristic information relating to the printing apparatus associated with the image is available when the image is printed on the selected printer, said analysis comprising:

(a) generating a modified first soft proof image, to which the first color adjustment parameter has been applied, and which also takes into consideration the second characteristic information relating to the printing apparatus to be used for printing;

(b) generating a second soft proof image, based on the image and taking into consideration the second characteristic information relating to the printing apparatus to be used for printing;

(c) determining that a difference in color between an image to be printed, without a soft proof image and without taking into consideration the first or second characteristic information and the first modified soft image is smaller than a difference in color between said image to be printed, without a soft proof image and without taking into consideration the first or second characteristic information and the second soft image; and print the image with applied first color adjustment parameter.

2. The image processing apparatus according to claim 1, the program further causing the image processing apparatus to:

generate a preview image based on the image and the first color adjustment parameter used in the color adjustment processing for the image without taking in to consideration the first characteristic information on the printing apparatus;

display the preview image on the screen instead of the first soft proof image in response to a user's instruction; and store the color adjustment parameter used in the color adjustment processing that is performed while the preview image is being displayed on the screen, and associate said color adjustment parameter with the image without the information relating to the printing apparatus.

3. The image processing apparatus according to claim 1, wherein the characteristic information relating to the printing apparatus comprises information indicating at least one of a model of the printing apparatus, a printing characteristic of the printing apparatus, or a color characteristic of the printing apparatus.

4. The image processing apparatus according to claim 1, the program further causing the image processing apparatus to:

issue a warning if the information relating to the selected printing apparatus does not correspond to the information relating to the printing apparatus associated with the image.

5. An image processing method comprising:

executing color adjustment processing for an image according to a user manipulation;

generating a soft proof image based on the image, a color adjustment parameter used in the color adjustment processing for the image according to a user manipulation and taking into consideration the first characteristic information relating to a printing apparatus;

displaying the first soft proof image on a screen;

storing the first color adjustment parameter used in the color adjustment processing that is performed while the first soft proof image is being displayed on the screen, taking into consideration the first characteristic information relating to the printing apparatus, and associating the first color adjustment parameter used in color adjustment with the image;

selecting a printing apparatus to be used for printing of the image and acquiring a second characteristic information relating to the printing apparatus to be used for printing of an image from the printing apparatus;

determining whether or not the first characteristic information and the second characteristic information match each other;

in the event that there is no match, performing analysis to determine whether the first color adjustment parameter, taking into consideration the characteristic information relating to the printing apparatus associated with the image is available when the image is printed on the selected printer, said analysis comprising:

(a) generating a modified first soft proof image, to which the first color adjustment parameter has been applied, and which also takes into consideration the second characteristic information relating to the printing apparatus to be used for printing;

(b) generating a second soft proof image, based on the image and taking into consideration the second characteristic information relating to the printing apparatus to be used for printing;

(c) determining that a difference in color between an image to be printed, without a soft proof image and without taking into consideration the first or second characteristic information and the first modified soft image is smaller than a difference in color between said image to be printed, without a soft proof image and without taking into consideration the first or second characteristic information and the second soft image; and printing the image with applied first color adjustment parameter.

6. A non-transitory computer-readable storage medium storing a program for causing a computer to execute:

executing color adjustment processing for an image according to a user manipulation;

generating a first soft proof image based on the image, a color adjustment parameter used in the color adjustment processing for the image according to a user manipulation and taking into consideration the first characteristic information on relating to a printing apparatus;

displaying the first soft proof image on a screen;

storing the first color adjustment parameter used in the color adjustment processing that is performed while the first soft proof image is being displayed on the screen, taking into consideration the first characteristic information relating to the printing apparatus and associating the first color adjustment parameter used in color adjustment with the image;

selecting a printing apparatus to be used for printing of the image and acquiring a second characteristic information relating to the printing apparatus to be used for printing of an image from the printing apparatus;

determining whether or not the first characteristic information and the second characteristic information match each other;

in the event that there is no match, performing analysis to determine whether the first color adjustment parameter, taking into consideration the characteristic information relating to the printing apparatus associated with the image is available when the image is printed on the selected printer, said analysis comprising:

(a) generating a modified first soft proof image, to which the first color adjustment parameter has been applied, and which also takes into consideration the second characteristic information relating to the printing apparatus to be used for printing;

(b) generating a second soft proof image, based on the image and taking into consideration the second characteristic information relating to the printing apparatus to be used for printing;

(c) determining that a difference in color between an image to be printed, without a soft proof image and without taking into consideration the first or second characteristic information and the first modified soft image is smaller than a difference in color between said image to be printed, without a soft proof image and without taking into consideration the first or second characteristic information and the second soft image; and printing the image with applied first color adjustment parameter.

* * * * *